Patented Sept. 9, 1930

1,775,136

UNITED STATES PATENT OFFICE

PAUL NEUMANN, OF BERLIN-SCHONEBERG, GERMANY, ASSIGNOR TO TELEPHON-APPARAT FABRIK E. ZWEITUSCH AND COMPANY, OF CHARLOTTENBURG, BERLIN, GERMANY

DIPPING SOLUTION FOR ELECTRIC CONDENSERS

No Drawing. Application filed July 13, 1928, Serial No. 292,602, and in Germany October 29, 1927.

The present invention relates in general to impregnating solutions, more particularly to an impregnating solution for paper-foil condensers, and the principal object of the invention, briefly stated, is the production of a new and improved impregnating solution for such condensers, a solution which will moisture proof the condenser and which is not affected by temperature or humidity variations.

If a roll, comprising alternate layers of paper and metal foil, be boiled in a solution (auxiliary dielectric) such as paraffin for example, under vacuum and be pressed, it will have a high insulation resistance between the layers of metal. If the roll be stored in air, its insulation resistance will continue to improve. The same phenomenon applies to the voltage required to break down the condenser of this rolled type.

If the roll be stored in a partial vacuum, it will only retain its electrical properties provided that the temperature remains constant. If the roll be placed in a partial vacuum, it is not possible to prevent damp air penetrating the dielectric, but it would not affect the manner in which the insulation condition of the paraffin roll is dependent on the temperature, nor would it affect the reduced rigidity due to increased temperature, this reduced rigidity involving an alteration in the capacity. For constructional reasons it is hardly possible to render air tight the cup, in which the roll is usually located. Furthermore it would be too costly to do so.

The dipping solution according to the invention has the properties required for a condenser, namely high melting point, high initial insulation, little independence on temperature variation, it takes a high voltage to break down the insulation and the solution sticks very well. In spite of its high melting point, this dipping solution is suitable for using it in the construction of condensers at the usual temperature. This property renders the condensers specially suitable for the tropics.

The mixture comprises colophony and earth wax (raw ozokerite) in a proportion of about nine parts of raw ozokerite to one part of colophony. If the condensers are to be used where steam is added to the atmosphere and where there is much variation in the temperature, it is advisable to use one-half colophony and one half "carnauba" wax instead of one part colophony.

What is claimed is:

An impregnating solution adapted for use in impregnating the dielectrics of condensers to render the same suitable for use in tropical climates comprising approximately 90% raw ozokerite, 5% colophony and 5% carnauba wax.

In witness whereof, I hereunto subscribe my name this 14th day of June, A. D. 1928.

PAUL NEUMANN.